March 6, 1951  J. C. RICHARDSON  2,544,108
PIPE CONNECTING
Filed Sept. 18, 1946

INVENTOR.
James C. Richardson
BY
Johnson, Kline and Hensel
ATTORNEYS

Patented Mar. 6, 1951

2,544,108

UNITED STATES PATENT OFFICE 2,544,108

PIPE CONNECTING

James C. Richardson, Utica, N. Y., assignor to The Brockway Company, Naugatuck, Conn., a corporation of Connecticut Application September 18, 1946, Serial No. 697,692

3 Claims. (Cl. 285—86)

This invention relates to connectors for ductile pipes, tubing, etc., and more particularly to connectors of the types which cause the pipe to flare as the connection is being made up.

Several other species of this invention are disclosed in my copending application Serial No. 691,914, filed August 21, 1946, now Patent No. 2,497,273, in which the problems involved and the solutions offered are fully discussed.

In the form of the invention disclosed herein, the parts of the connection are so shaped and arranged that they may be used with convenience for connecting opposite ends of short straight sections of pipe to fittings. To this end the connector and fitting are so made that the length of the flare-forming projection and the depth of the flare-receiving cavity are reduced to minimum dimensions, thus reducing the amount of the pipe which must be bent or flexed in order to extend over the projections and into the recess when being connected.

I have found it possible to do this because, with my connection, the grip of the fitting and connector on the pipe is so positive and tenacious that the length of the flared portion may be substantially less than with connectors heretofore proposed.

Another feature of this form of the invention is the shape and arrangement of the parts so that the wrench pressure or torque required to make up the connection is substantially reduced.

Another feature is that the parts are so designed that for connections of several sizes the contour of each corresponding part and the profile of the tools and gauges used to make and inspect the part are the same, the only difference being in the diameters of the parts. This is an important advantage from a manufacturing viewpoint because it permits the same tools and the same cams on an automatic screw machine to be used to make the parts of several sizes—it being merely necessary to set the tools closer to or farther from the axis of the machine depending on whether the part is small or large size.

Still another feature of the preferred form of my invention involves the provision of means for holding the connector parts of my connection together when pre-assembled, so that they may be supplied and installed as a unit ready to receive a pipe to be connected, yet so arranged that the nut can be removed from the fitting and slid back along the pipe to permit inspection of the joint.

Other features and advantages will hereinafter appear.

In the accompanying drawings—

Figure 1:
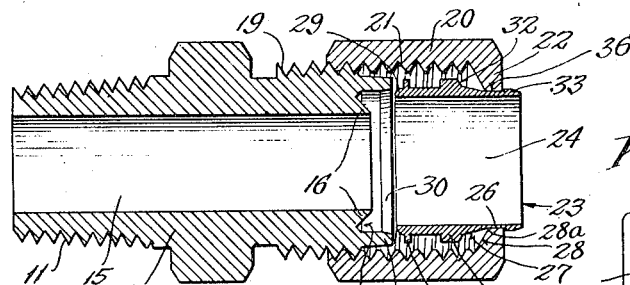
Figure 1 is a longitudinal section of the connection made according to the present invention, showing the positions of the parts when the nut is started on the fitting.

The term "pipe" as used herein is intended to include all sorts of hollow bodies such as are commonly termed pipes, tubes, conduits, etc., and the term "fitting" as used herein is intended to include any separate or separable or integral part of such size and form as is adapted to receive the nut of the connector.

The form of the connector disclosed herein comprises a body 10 which may have a screw-threaded portion 11 adapted to be threaded in a hole 12 in some structure or device 13 having an orifice 14 which it is desired to connect to a pipe through a central bore 15 of the fitting. When convenient or desirable, the body 10 may be made integral with the structure 13.

For the purposes of the present invention, the outer end of the body 10 is provided with a flare-forming projection 16 which is conical in form for use with pipe of circular cross-section. The projection 16 is located in a cavity 17 formed by a projecting sleeve 18. It is over this projection 16 and in this cavity 17 that the end of the pipe is flared and sealed.

The exterior of the outer end of the body 10 is provided with screw threads 19 over which there is threaded (in starting position as shown in Fig. 1) a nut 20 having internal threads 21 and an end wall or flange 22. The nut 20 functions as a draft member to advance the pipe to flare and clamp it to the body.

Housed within the nut 20 is a sleeve or ferrule 23 having a central bore 24 which permits a pipe, of the size for which the connector is designed, to have its end slid into the ferrule with no obstructing resistance therefrom. The ferrule has an annular shoulder or ring 25 which is engaged by the flange 22 of the nut whereby the ferrule is advanced by screwing-up of the nut on the body.

In common with the forms of my invention shown in my said copending application, the connector herein disclosed may be attached to the fitting by having the nut started on the end of the fitting and then the pipe is inserted in the ferrule as far as it will go—that is to say, until the end of the pipe engages the flare-forming projection 16; then the nut 20 is tightened on the fitting. In the first part of the movement of the nut, a driving connection, frictional in the forms of my invention shown in my said copending application, but positive in the form thereof shown herein, is established between the ferrule and the nut. Then the continued operation of the nut causes the end of the pipe to ride up on the flare-forming projection and become flared, while at the same time the inner end of the ferrule is forced with the flared end of the pipe into the cavity and completely fills the cavity.

After the pipe is flared and the end of the ferrule is formed around the flared end of the pipe, the nut may be backed off and the ferrule and pipe may be taken away from the fitting for inspection, cleaning etc. Or, if it is not convenient to flare the pipe directly on the fitting 10, it may be done by using a similarly shaped piece as a tool, and then, after the pipe is flared and the ferrule is formed, the connector may be applied to a fitting 10 by simply tightening the nut over the fitting.

It will be seen from what has been said and from what follows that, in the use of the connection of the present invention, it is not necessary to preform the pipe or place on the pipe any sleeve or ferrule, but it is merely necessary to cut the pipe to length and insert it into the ferrule while the ferrule and nut are on the fitting or similar part in started position.

One of the features of the form of this invention illustrated in this application is the arrangement whereby the ferrule is first caused to emboss the pipe so that a positive driving connection between the pipe and the ferrule is established.

This is accomplished by making the outer end of the ferrule sufficiently ductile so that when pressure is brought to bear on it by the nut being screwed up on the body, while advancement of the ferrule is retarded, the material of the ferrule is forced radially inwardly against the pipe causing the pipe to be embossed circumferentially. For this purpose, the outer end of the ferrule has a portion 26 of reduced cross-section and adjacent thereto a cam surface 27 engaging a cam surface 28 on the flange 22 of the nut, so that as the nut advances, the material of the portion 26 is forced inwardly as shown in Fig. 2, forming and entering an annular groove or embossing A in the pipe P.

While pressure is thus being exerted on the cam 27, advancement of the ferrule is retarded by the inner end thereof engaging the end of the sleeve 18 on the body. To first accomplish this and at the same time provide another embossing near the end of the pipe, the inner end of the ferrule has a rounded or cam surface 29 which engages a bevel or cam surface 30 on the sleeve 18 at the entrance of the cavity 17. The result of this arrangement is that as the ferrule is advanced by the nut and the inner end of the ferrule is forced inwardly forming an embossing B in the pipe, movement of the ferrule is resisted so that the cam surfaces 27 and 28 on the nut and ferrule may emboss the portion 26 of the ferrule.

Figures 2, 5:
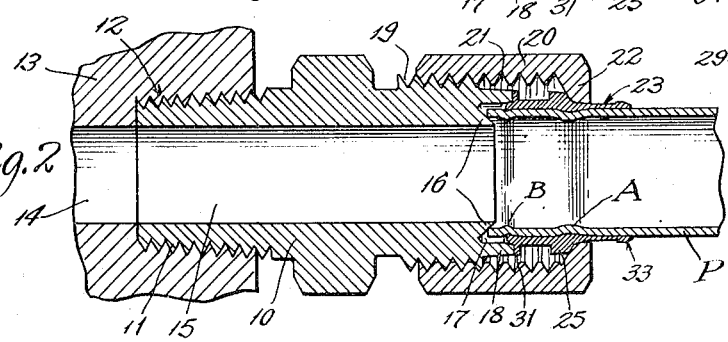
Fig. 2 is a similar view, but shows the fitting mounted in a supporting structure and the nut partly screwed up on the fitting—the pipe being gripped by the connector.
Fig. 5 is an elevation of a modification of the ferrule used in the fitting shown in Figs. 1 to 4.

The effect of forming the embossing B at the outer end of the pipe is to start the pipe flaring over the projection 16 as shown in Fig. 2.

To insure that these embossing operations are performed before the ferrule advances too far into the cavity 17, the leading end of the ferrule is provided with a flange 31 which abuts against the outer end of the projection 18. The width of this flange is such that as the nut is tightened from the position shown in Fig. 2 to the position shown in Fig. 3, the flange 31 is sheared from the ferrule and simply rides over the outer surface thereof.

In moving from the position shown in Fig. 1 to the position shown in Fig. 2, the flange 22 on the nut in depressing the ferrule to produce the embossing A virtually irons out the cam surface 27, and the cam surface 28 on the flange 22 engages another cam surface 32 on the flange 25 of the ferrule. This cam surface 32 is steeper than the cam surface 27 and acts as a driving shoulder, although being inclined there is a sufficient inward component of the force which tends to tightly hold the ferrule down against the pipe as the nut advances.

Preferably the inner edge 28a of cam surface 28 is slightly rounded to avoid any cutting action on cam surface 27, and to facilitate the ironing out effect thereon. Actually, interaction of the edge 28a of cam surface 28 on cam surface 27 deforms both of these surfaces so that edge 28a is blunted and cam surface 27 is indented, both surfaces finally each flowing along a surface having a curved cross-section. As a result close fitting engagement is formed between the flange 25 of ferrule 23 and flange 22 of nut 20.

Figure 3:
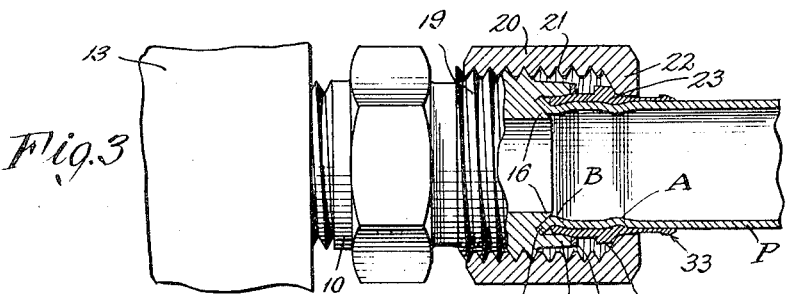
Fig. 3 is a view similar to Fig. 2, but shows the positions of the parts just before the nut is completely screwed up.

In moving from the position shown in Fig. 2 to the position shown in Fig. 3, the end of the ferrule is driven partially into the cavity while the flare F on the pipe has been completed. The continued tightening of the nut will swage the end of the ferrule into the cavity and against the flare F of the pipe as shown in Fig. 4, where a seal is not only produced between the flare F and the projection 16 on the one side but also between the flare F and the wall of the cavity 17 by the ferrule on the other side.

Thus, as in the other forms of my invention shown in my said copending application, if for any reason fluids should pass between the flared end of the pipe and the projection, they would not escape because they would be blocked off by the ferrule being wedged between the pipe and the wall of the cavity.

Figure 4:
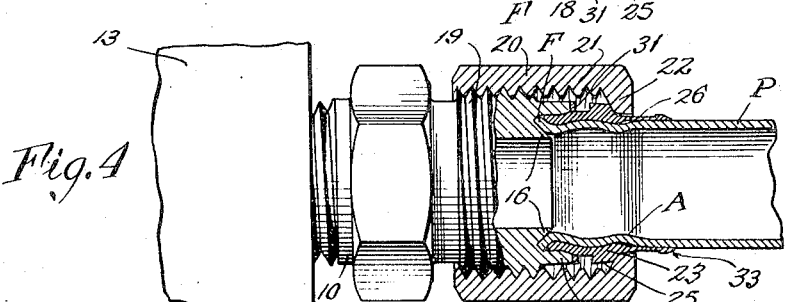
Fig. 4 is a view similar to Figs. 2 and 3, but showing the parts in the positions they assume when the nut is completely screwed up and the connection is made.
Figure 6:
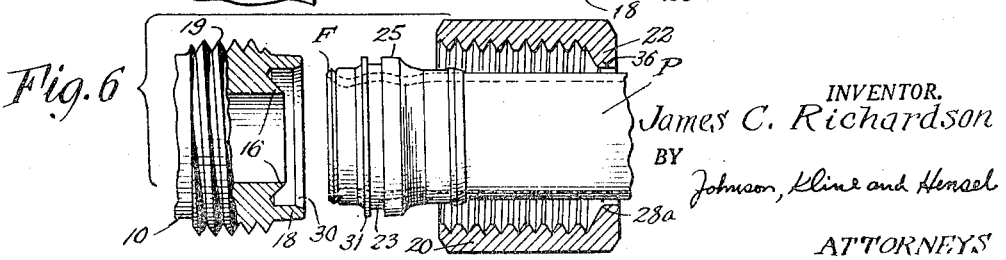
Fig. 6 is a view showing the joint of Fig. 4 with the nut backed off the ferrule and the pipe and ferrule withdrawn from the body.

During the movement of the nut and ferrule from the position shown in Fig. 3 where the flare F is completely seated in the cavity to the position shown in Fig. 4 where the ferrule is also completely seated in the cavity, relative movement between the ferrule and the pipe occurs, but this has no deleterious effect. It merely slightly reforms the embossing A on the pipe.

Resistance to axial movement of the pipe is further intensified and a more perfect seal secured between the projection 16 and the flare F on the pipe by reason of the fact that the pipe is fully flared and its forward movement arrested by its edge reaching the end of cavity 17 before the ferrule 23 is completely seated in said cavity. Thus, the leading edge of the pipe is forced outward ahead of the leading edge of the ferrule so that the latter clamps the pipe firmly against the base of the cavity 17. By completing the flaring of the pipe before the ferrule completes its movement, the extreme end of the pipe projects axially beyond the ferrule thus assuring that the clamping action between the pipe and the ferrule and fitting is not only lateral or radial but also to a substantial extent in an axial direction. Thus, in the finished joint the flare F extends axially beyond and also radially over the end of the ferrule.

It will thus be seen that when the connection is made up, the pipe has an undulating surface in contact with an undulating surface of the connector, thereby offering resistance to axial movement of the pipe in addition to that offered by the flare F being clamped to the fitting. The pipe is thus clamped circumferentially at two longitudinally spaced points, offering maximum resistance to loosening of the joint by lateral as well as axial vibration or movement. The clamping action has no tendency to cut into the pipe which would weaken its resistance to fracture at any point.

In common with the constructions of my invention shown in my said copending application, the flaring of the pipe is accomplished by solely axial movement of the pipe and thus by extrusion over the projection rather than by spinning the end of the pipe over the projection which occurs with prior proposals of others when the pipe turns. Because of this advantage of the present invention, should the pipe used be of the type known as Bundy tubing where there is usually a slight groove extending longitudinally of the pipe both on the inner and outer surfaces, leaks cannot occur through these grooves because the metal of the ferrule and of the projection are virtually kneaded into the pipe when the pipe is being flared by the straight line action over the projection.

In the form of my invention, herein illustrated, I provide means for holding the ferrule 23 and nut 20 together so that they can be pre-assembled and sold as a unit, with or without the body 10, ready to receive a pipe. Moreover, said means is so constructed that after the connection is made up, the nut 20 can be backed off the body 10 without disturbing the pipe or ferrule 23, the latter presenting no obstruction to removal of the nut 20. Thus, the condition of the connection can be examined at any time and the nut replaced again to restore it to operative condition.

The aforesaid means comprises a lateral annular flange 33 having an abutment or shoulder 34 on its inner or forward side, and a rounded or conical camming surface 35 on its outer or rearward side. The outside diameter of flange 33 is sufficiently greater than the inside diameter of the aperture 36 at the rear end of nut 20, so that flange 33 can be forced through aperture 36 without substantial permanent distortion of the parts which thereafter spring or are sprung back to normal position with the flange 33 located outside the flange 22 of the nut 20. The cam surface 35 facilitates the operation by camming the flange 33 inward and/or flange 22 outward sufficiently to permit these flanges to pass each other.

When the connection is made up, however, the work done by flange 22 in ironing out cam surface 27 on the ferrule 23 permanently flexes the flange 22 on the nut outward, enlarging the diameter of aperture 36 sufficiently to permit flange 22 to be slid over flange 33 without obstruction. Thus, after the connection is made up, nut 20 can be backed off of threads 19 without obstruction from flange 33, and without disturbing any other part of the connection, and may be replaced to tighten the connection in its original condition.

I have found that by maintaining the axial length of the projection 16 the same for a series of connectors having different diameters of pipes within limits, the only alterations which need be made in the dimensions of the ferrule, the nut, and the fitting to accommodate these pipes of various sizes are diametrical dimensions.

Accordingly, in making the parts of my connectors for various sizes of pipes, the same screw machine tools and cams and test gauges may be used for the different size pieces, it being merely necessary to back the tools away from the center of the screw machine to make the parts for the larger size connectors and, of course, use stock of larger diameter.

It will be noted by comparison of the construction herein disclosed with those of my said copending application that the height of the projection 16 is substantially decreased in the present case over the others, and this I am able to accomplish because of the manner in which the end of the ferrule is swaged around the pipe in the cavity. By having the projections 16 shorter, it is more convenient to make up short lengths of pipe when connecting up a machine for instance, because less lateral bowing of the pipe is required when putting a straight short pipe between two fixed fittings.

If the ferrule 23 is of such rigid construction as to render the making up of the connection difficult, by resistance of the material of the ferrule to the clamping action of cam surfaces 27 and 28, the deformation of the ferrule can be facilitated by forming a longitudinal slot 37 in the ferrule as shown in Fig. 5, extending between points adjacent the opposite ends thereof.

Variations and modifications may be made within the scope of this invention and portions of the improvements may be used without others.

I claim:

1. A combined tube-connector and tube-flarer, including in combination: a first body-member provided with threads for engagement with the threads of the hereinafter-mentioned second body-member, said first body-member being formed with a longitudinal passage and with an inclined flare-gripping seat surrounding the said passage, the said first body-member also being provided with a stop-abutment facing toward and positioned for engagement by the stop-projection of the hereinafter-mentioned tube-gripping band; a second body-member provided with threads for engagement with the threads of the said first body-member, the said second body-member being formed with a tube-receiving passage and with an inclined deflecting-surface around the said passage and inclined in the same general direction as the flare-gripping seat of the said first body-member; and a tube-gripping band adapted to fit upon the end-portion of a tube and having a flare-gripping seat complementing and adapted to cooperate with the flare-gripping seat in the first body-member, the said tube-gripping band also having inwardly-bendable gripping-means positioned to engage with the inclined deflecting-surface of the said second body-member to be forced inwardly thereby into gripping engagement with the periphery of a tube, the said tube-gripping band also having upon its exterior a stop-projection which is normally rigid therewith but displaceable with respect thereto, the said stop-projection being located for engagement with the stop-abutment of the said first body-member prior to the cooperation of the flare-gripping seat of the said band with the flare-gripping seat of the said first body-member; the relative resistances to displacement of the gripping-means and the stop-projection of the said tube-gripping band being such that the said gripping-means will be deflected into gripping engagement with a tube before the said stop-projection is displaced.

2. A connector for flaring the end of a ductile pipe over a recessed flare-forming end of a body and clamping the flared end to said body or another body in leakproof engagement therewith, comprising a ferrule for embossing the pipe at a place spaced from the end thereof; a draft member attachable to the body and when operated engaging and advancing the ferrule and pipe toward the flare-forming end to flare and clamp the pipe to the body, said ferrule having a bore into which the end of the pipe may be passed with no obstructing resistance from the ferrule with the draft member attached to the body in starting position; means including cooperating cam surfaces on the ferrule and the draft member whereby the ferrule is deformed inwardly and squeezed against the pipe to emboss the pipe and thereby form a driving connection therewith, and is then advanced to flare the pipe over the flare-forming end of the body during the initial and continued advancement of the ferrule toward the body by operation of the draft member; and an integral flange on the ferrule adapted when the draft member is being tightened on the body to abut the end of the body and retard advancement of the ferrule while the ferrule is embossing the pipe, and then to be sheared from the ferrule as the latter enters the recess in the body and becomes compressed on the pipe.

3. A connector for flaring the end of a ductile pipe over a recessed flare-forming end of a body and clamping the flared end to said body or another body in leakproof engagement therewith, comprising a ferrule for embossing the pipe at a place spaced from the end thereof; a draft member attachable to the body and when operated engaging and advancing the ferrule and pipe toward the flare-forming end to flare and clamp the pipe to the body, said ferrule having a bore into which the end of the pipe may be passed with no obstructing resistance from the ferrule with the draft member attached to the body in starting position; means including cooperating cam surfaces on the ferrule and the draft member whereby the ferrule is deformed inwardly and squeezed against the pipe to emboss the pipe and thereby form a driving connection therewith, and is then advanced to flare the pipe over the flare-forming end of the body during the initial and continued advancement of the ferrule toward the body by operation of the draft member, said ferrule having a reduced cross-section at its outer end increasing its ductility and having adjacent thereto said cam surfaces cooperable with the cam surface on the draft member, whereby when the draft member is tightened on the body the outer end of the ferrule is forced inwardly radially against the pipe forming and entering an annular embossment of the pipe and providing a driving connection with the pipe for the subsequent flaring operation; and a shear-ring on the ferrule engaging the body of the fitting to retard advancement of the ferrule while the outer end of the ferrule is embossing the pipe.

JAMES C. RICHARDSON.

REFERENCES CITED

The following references are of record in the file of this patent:

UNITED STATES PATENTS

| Number | Name | Date |
|---|---|---|
| 1,790,025 | Schnaier | Jan. 27, 1931 |
| 2,112,239 | Guarneschelli | Mar. 29, 1938 |
| 2,417,536 | Wurzburger | Mar. 18, 1947 |

FOREIGN PATENTS

| Number | Country | Date |
|---|---|---|
| 394,413 | Great Britain | June 29, 1933 |